(12) United States Patent
Hsiao

(10) Patent No.: US 7,605,880 B2
(45) Date of Patent: Oct. 20, 2009

(54) LIQUID CRYSTAL DISPLAY

(75) Inventor: Chih-Chun Hsiao, Kaohsiung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 347 days.

(21) Appl. No.: 11/553,469

(22) Filed: Oct. 27, 2006

(65) Prior Publication Data

US 2008/0100775 A1    May 1, 2008

(51) Int. Cl.
G02F 1/1335 (2006.01)
G02B 6/00 (2006.01)

(52) U.S. Cl. .............................. 349/65; 349/50; 349/61; 385/147

(58) Field of Classification Search ........................ None
See application file for complete search history.

(56) References Cited

U.S. PATENT DOCUMENTS

| | | | |
|---|---|---|---|
| 6,286,971 B1 | 9/2001 | Hori | |
| 6,545,732 B2 | 4/2003 | Nakano | |
| 7,257,306 B2 * | 8/2007 | Sakurai et al. | 385/147 |
| 7,457,510 B2 * | 11/2008 | Lee et al. | 385/146 |
| 2003/0128307 A1 * | 7/2003 | Ito et al. | 349/58 |
| 2005/0185113 A1 | 8/2005 | Weindorf et al. | |
| 2006/0268194 A1 * | 11/2006 | Morimoto et al. | 349/65 |
| 2007/0046859 A1 * | 3/2007 | Huang et al. | 349/65 |

FOREIGN PATENT DOCUMENTS

| | | |
|---|---|---|
| CN | 1716041 | 1/2006 |
| JP | 2006-268066 | 10/2006 |
| TW | 567293 | 12/2003 |
| TW | 594248 | 6/2004 |

* cited by examiner

Primary Examiner—Tina M Wong
(74) Attorney, Agent, or Firm—Jianq Chyun IP Office

(57) ABSTRACT

A liquid crystal display (LCD) including a backlight module, a LCD panel, a front frame, and a light strip is provided. The backlight module includes a back plate and a light guide plate (LGP), wherein the back plate has plural sidewalls and an opening opposite to one of the sidewalls. The LGP is disposed in the back plate and suitable for passing in and out the back plate through the opening. The LGP has a light entering surface, and the opening exposes the light entering surface. The LCD panel is disposed on the back plate, and the front frame is assembled with the back plate to fix the LCD panel. The light strip is disposed on the internal wall of the front frame and between the front frame and the light entering surface of the LGP. The heat generated by the light strip can be conducted to the front frame.

14 Claims, 7 Drawing Sheets

LIQUID CRYSTAL DISPLAY

BACKGROUND OF THE INVENTION

1. Field of the Invention

The present invention relates to a display. More particularly, the present invention relates to a liquid crystal display.

2. Description of Related Art

The development of displays is intensive due to the increasing demand. Wherein, cathode ray tube (CRT) display has been leading the market because of its excellent display quality and mature technology. However, due to its large power consumption and radiation, and the limitation in product minimization, CRT display cannot meet the requirements of light, thin, short, small, and low power consumption. Thus, thin film transistor liquid crystal display (TFT-LCD) having such advantages as high display quality, high space efficiency, low power consumption, and no radiation is becoming the mainstream on the market.

TFT-LCD module is composed of a liquid crystal display (LCD) panel and a backlight module. Wherein the LCD panel includes a thin film transistor array substrate, a color filter substrate, and a liquid crystal layer disposed between the two, and the backlight module provides planar light source for the LCD panel so that the TFT-LCD module can display images.

FIG. 1A is a top view of a conventional backlight module, and FIG. 1B is a cross-sectional view of the conventional backlight module in FIG. 1A. Referring to FIG. 1A and FIG. 1B, the conventional backlight module 100 includes a back plate 110, a light guide plate (LGP) 120, a flexible printed circuit (FPC) 130, a plurality of light emitting diodes (LEDs) 140, a reflector 150, a plurality of optical films 160, and a frame 170. Wherein, the light guide plate 120 is disposed on the back plate 110, and the reflector 150 is disposed between the light guide plate 120 and the back plate 110. The LEDs 140 are disposed on the FPC 130 and beside the light guide plate 120. Moreover, the frame 170 is disposed on the back plate 1 10, and the optical films 160 are disposed between the frame 170 and the light guide plate 120.

The LEDs 140 produce heat during operation, and the higher the temperature is, the more the illumination efficiency of LEDs 140 is reduced. Thus, along with the increase in the size of the conventional backlight module 100 using the LEDs 140, the requirement in heat dissipation becomes the focus of design. Moreover, the heat produced by the LEDs 140 cannot be conducted to external further because of the low thermal conductivity of the frame 170.

SUMMARY OF THE INVENTION

Accordingly, the present invention is directed to provide a liquid crystal display to improve heat dissipation efficiency.

To achieve the aforementioned and other objectives, the present invention provides a liquid crystal display, which includes a backlight module, a liquid crystal display panel, a front frame, and a light strip. The backlight module includes a back plate and a light guide plate, wherein the back plate has a plurality of sidewalls and an opening, and the opening is opposite to one of the sidewalls. The light guide plate is disposed in the back plate and is suitable for passing in and out the back plate through the opening. The light guide plate has a light entering surface, and the opening exposes the light entering surface. The liquid crystal display panel is disposed on the back plate of the backlight module, and the front frame is assembled with the back plate to fix the liquid crystal display panel. The light strip is disposed on the internal wall of the front frame and between the front frame and the light entering surface of the light guide plate.

According to an embodiment of the present invention, the light strip includes a carrier and a plurality of point light sources disposed on the carrier.

According to an embodiment of the present invention, the liquid crystal display further includes a heat dissipation layer disposed between the front frame and the light strip.

According to an embodiment of the present invention, the tops of the sidewalls are curved into L shape to support the liquid crystal display panel.

According to an embodiment of the present invention, the backlight module further includes a buffer strip disposed between the liquid crystal display panel and the light guide plate.

According to an embodiment of the present invention, the backlight module further includes a reflector disposed between the buffer strip and the light guide plate.

According to an embodiment of the present invention, the top of the front frame adjacent to the sidewall of the light entering surface is curved into L shape.

According to an embodiment of the present invention, the backlight module further includes a plurality of locating blocks disposed in corners of the back plate.

According to an embodiment of the present invention, the material of the locating blocks comprises rubber.

According to an embodiment of the present invention, the point light sources are, for example, light emitting diode (LED) or organic light emitting diode (OLED).

According to an embodiment of the present invention, the backlight module further includes at least a first optical film disposed between the back plate and the light guide plate.

According to an embodiment of the present invention, the backlight module further includes at least a second optical film disposed between the liquid crystal display panel and the light guide plate.

According to an embodiment of the present invention, the material of the front frame comprises metal.

According to an embodiment of the present invention, the material of the front frame comprises iron or stainless steel.

As described above, in the present invention, the light strip is assembled with the front frame so that the heat produced by the light strip can be conducted to external through the front frame, so as to prevent the illumination efficiency of the light strip from being affected by local high temperature. In addition, compared to the conventional technology, wherein frame is used for supporting the LCD panel, back plate is used to support the LCD panel directly in the present invention, thus, the cost of the frame for supporting the LCD panel can be saved in the present invention.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
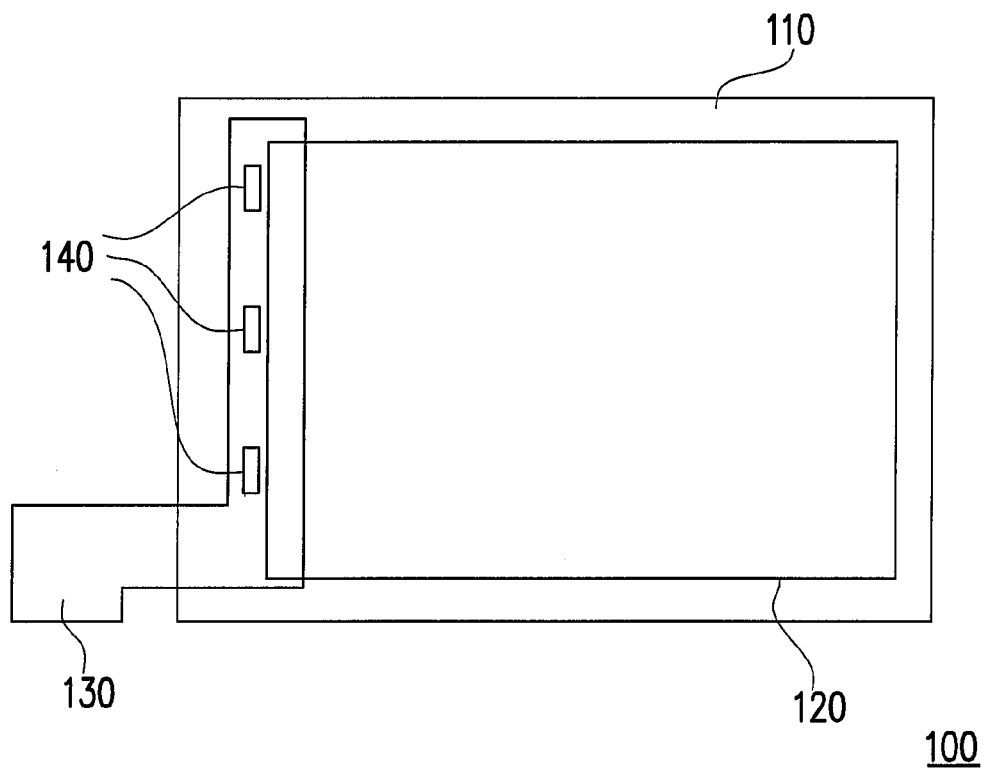
FIG. 1A is a vertical view of a conventional backlight module.
Figure 1B:
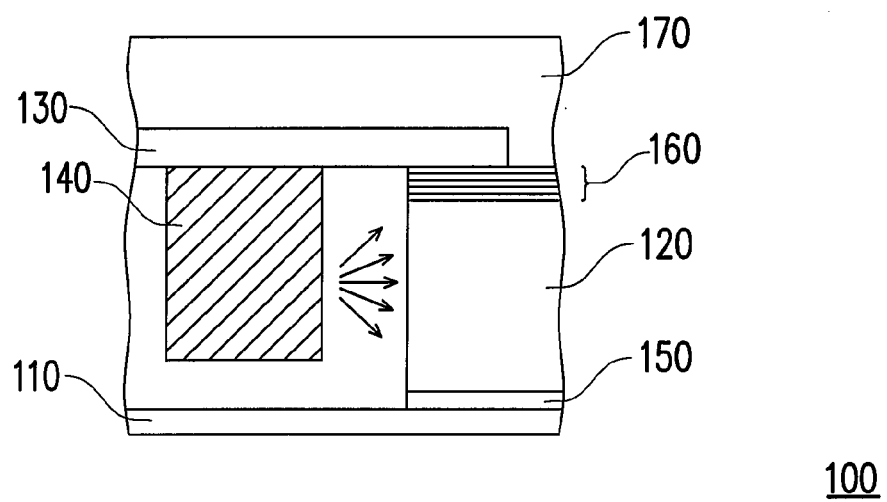
FIG. 1B is a cross-sectional view of the conventional backlight module in FIG. 1A.
Figure 2A:
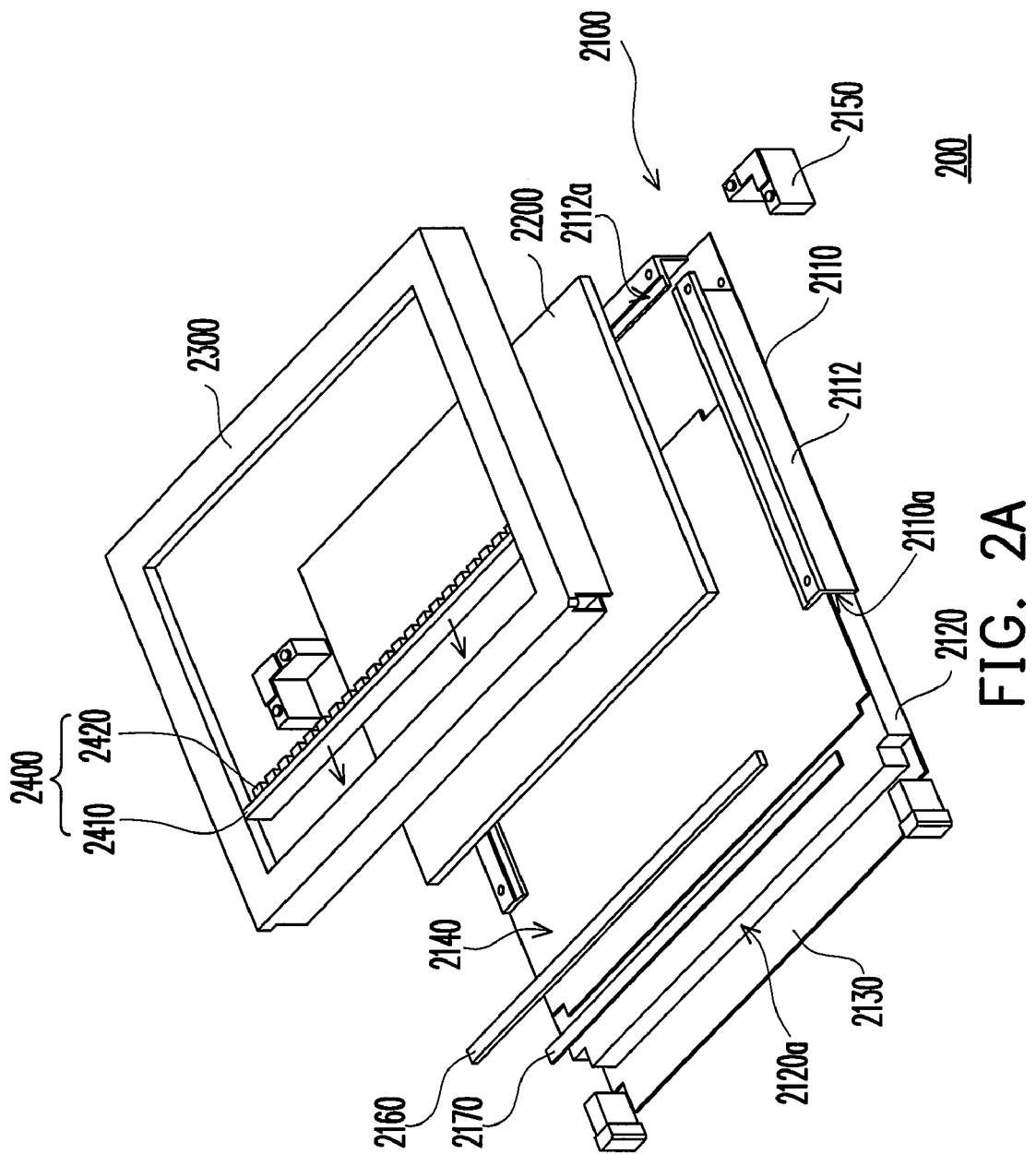
FIG. 2A is an exploded view of a liquid crystal display according to an embodiment of the present invention.
Figure 2B:
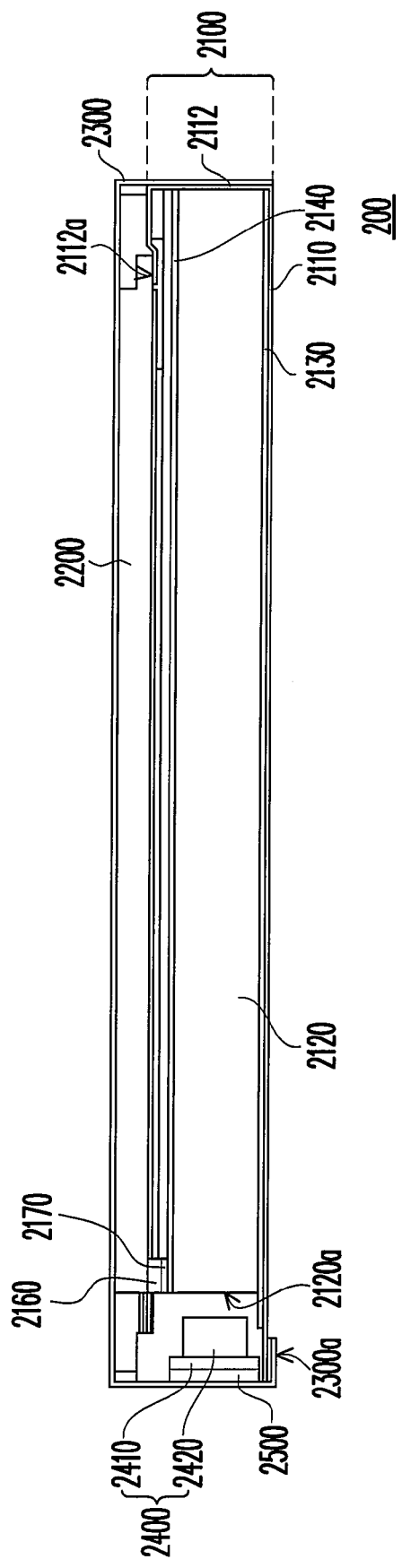
FIG. 2B is a cross-sectional view of a liquid crystal display according to an embodiment of the present invention.

FIG. 2A is an exploded view of a liquid crystal display (LCD) according to an embodiment of the present invention, and FIG. 2B is a cross-sectional view of a LCD according to an embodiment of the present invention. Referring to FIG. 2A and FIG. 2B, the LCD 200 in the present embodiment includes a backlight module 2100, a LCD panel 2200, a front frame 2300, and a light strip 2400. In the following, the structures of various components will be described in detail.

Figure 3:
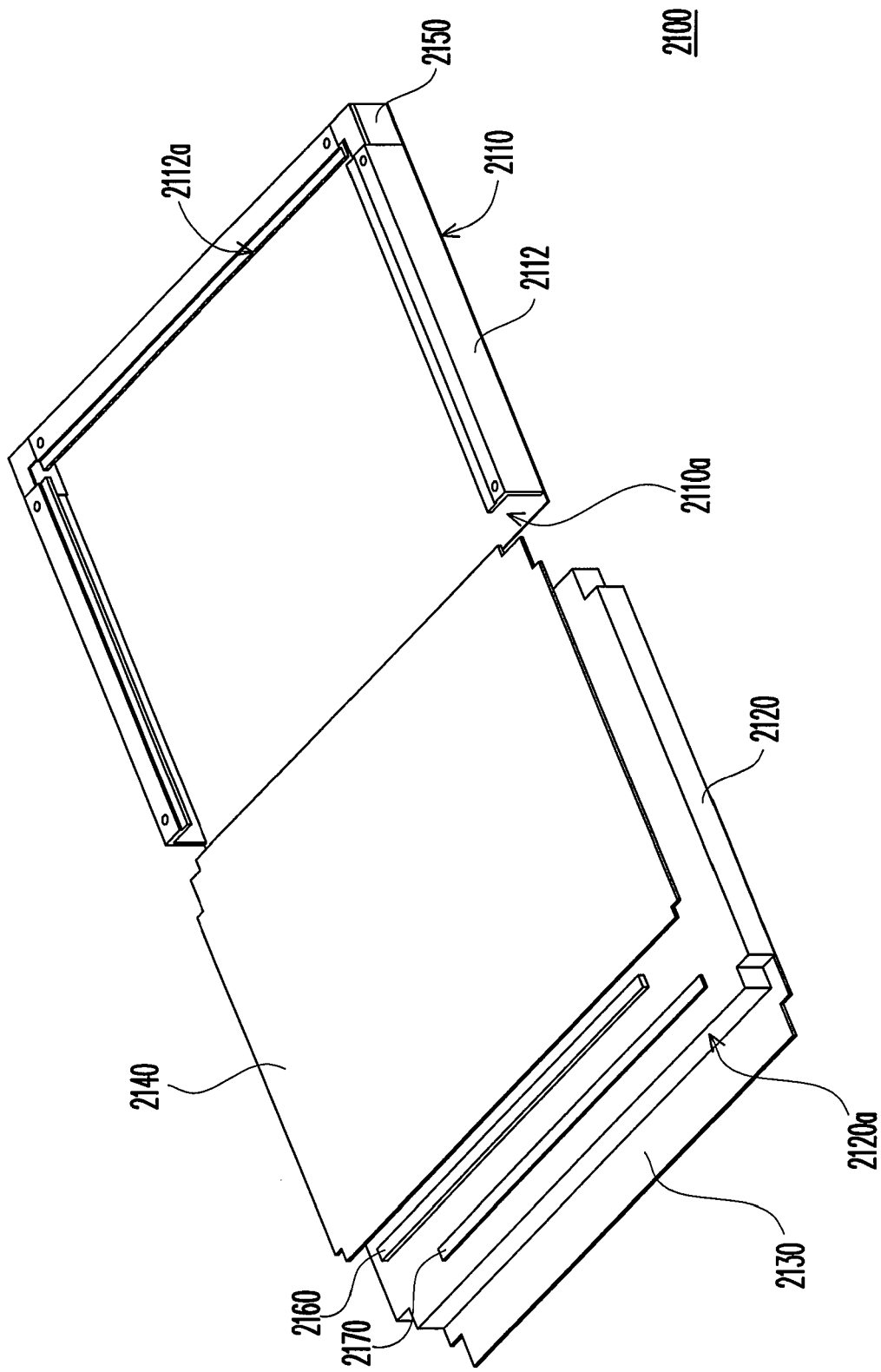
FIG. 3 is an exploded view of the backlight module in FIG. 2A.

FIG. 3 is an exploded view of the backlight module in FIG. 2A. Referring to FIG. 2A and FIG. 3, the backlight module 2100 includes a back plate 2110 and a light guide plate 2120, wherein the back plate 2110 has a plurality of sidewalls 2112 and an opening 2110a, and the opening 2110a is opposite to one of the sidewalls 2112. The light guide plate 2120 is disposed in the back plate 2110 and is suitable for passing in and out the back plate 2110 through the opening 2110a. In short, the light guide plate 2120 can be assembled with the back plate 2110 in extraction manner, thus, such backlight module 2100 is convenient for rework. Moreover, the light guide plate 2120 has a light entering surface 2120a, and the opening 2110a exposes the light entering surface 2120a.

To improve the optical quality of the backlight module 2100, the backlight module 2100 may further include at least a first optical film 2130 and at least a second optical film 2140, wherein the first optical film 2130 is disposed between the back plate 2110 and the light guide plate 2120, and the second optical film 2140 is disposed between the LCD panel 2200 and the light guide plate 2120. In particular, the first optical film 2130 is, for example, reflector, prism sheet, or other type of optical film, and the second optical film 2140 is, for example, diffuser, brightness enhancement film (BEF), dual brightness enhancement film (DBEF) or other type of optical film. In addition, the backlight module 2100 may further include a plurality of locating blocks 2150 disposed in the corners of the back plate 2110. The locating blocks 2150 can fix the positions of the light guide plate 2120, the first optical film 2130, and the second optical film 2140, and moreover, the locating blocks 2150 can increase the reliability of the LCD and eliminate the problem of light leakage. In addition, the material of the locating blocks 2150 may be rubber.

Figure 4:
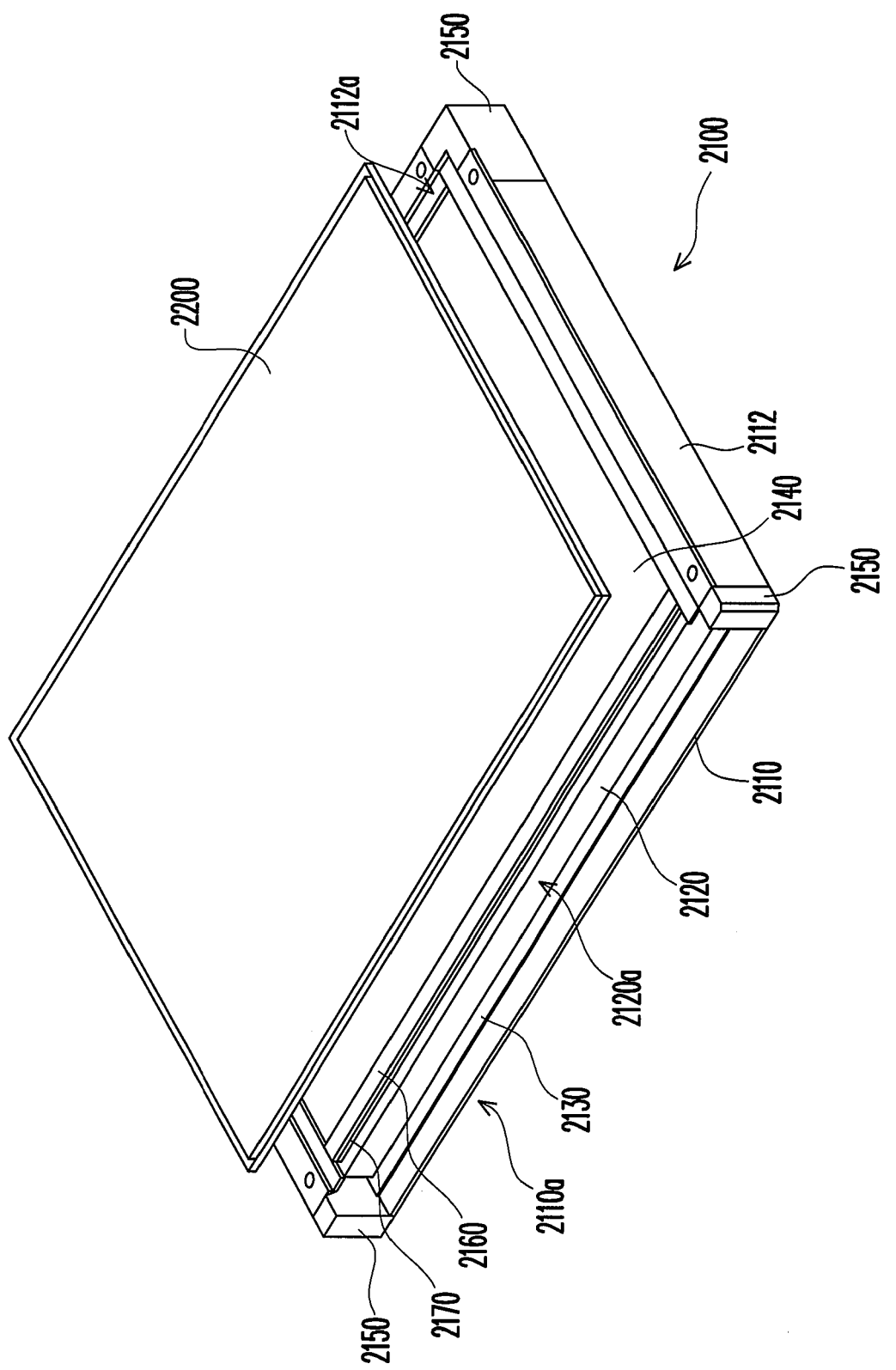
FIG. 4 is an assembly view of the backlight module and the liquid crystal display panel in FIG. 2A.

FIG. 4 is an assembly view of the backlight module and the LCD panel in FIG. 2A. Referring to FIG. 3 and FIG. 4, the LCD panel 2200 is disposed on the back to plate 2110 of the backlight module 2100. In particular, the tops 2112a of the sidewalls 2112 of the back plate 2110 are curved into L shape to support the LCD panel 2200. In addition, the backlight module 2100 further includes a buffer strip 2160 disposed between the LCD panel 2200 and the light guide plate 2110.

In the present embodiment, the tops 2112a of the sidewalls 2112 are on the same surface with the top surface of the buffer strip 2160 to support the LCD panel 2200. In addition, if the backlight module 2100 includes the second optical film 2140, the buffer strip 2160 shall be disposed on the second optical film 2140. In the embodiment, the backlight module 2100 further comprises a reflector 2170 disposed between the buffer strip 2160 and the light guide plate 2120.

Figure 5:
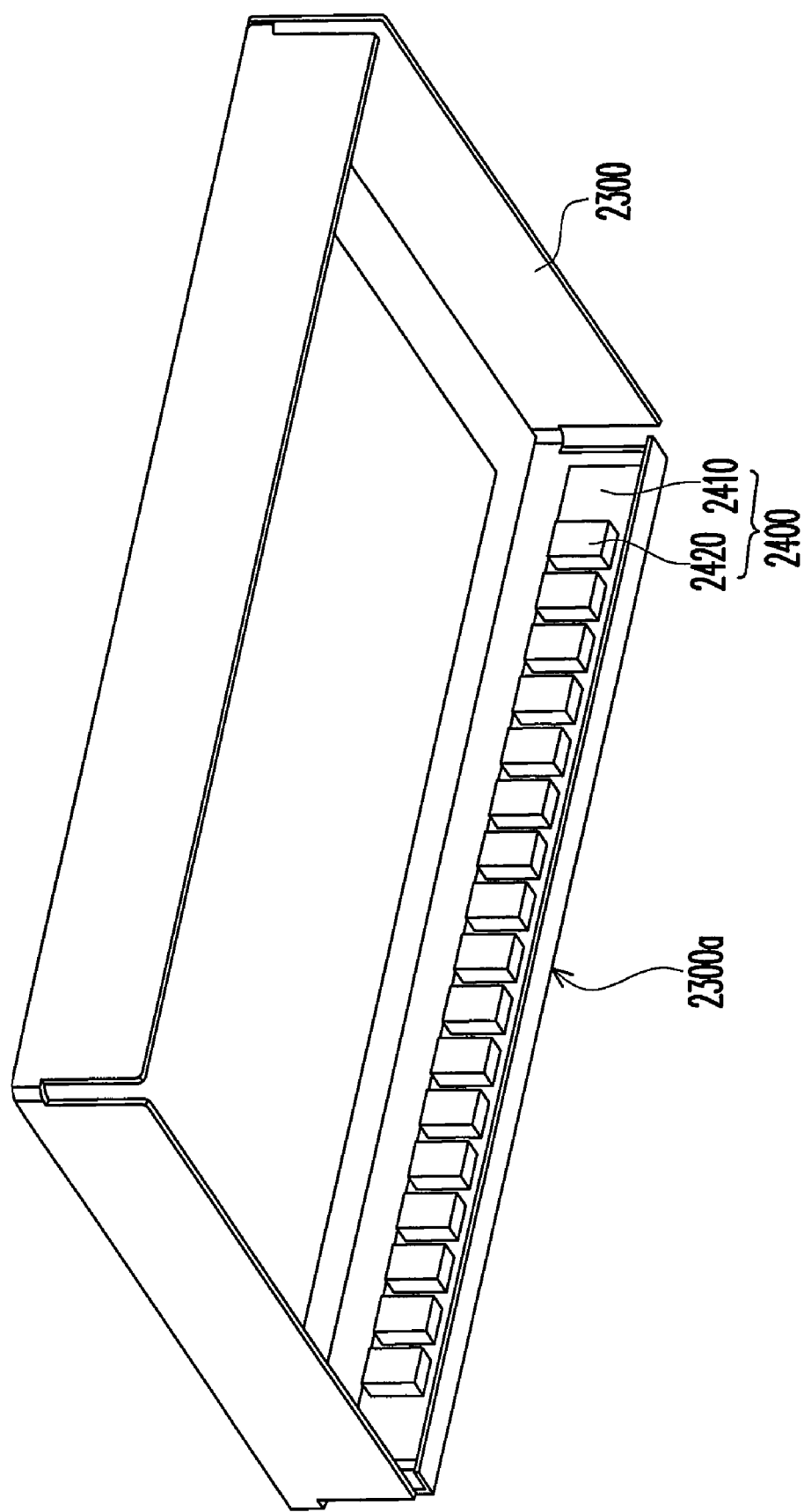
FIG. 5 is an assembly view of the front frame and the light strip in FIG. 2A.

FIG. 5 is an assembly view of the front frame and the light strip in FIG. 2A. Referring to FIG. 2B and FIG. 5, the light strip 2400 is disposed on the internal wall of the front frame 2300 and between the front frame 2300 and the light entering surface 2120a of the light guide plate 2120. In addition, the material of the front frame is, for example, iron, stainless steel or other material having high thermal conductivity. Moreover, the light strip 2400 includes a carrier 2410 and a plurality of point light sources 2420 disposed on the carrier 2410. In particular, the carrier 2410 is, for example, metal core printed circuit board (MCPCB), flexible printed circuit (FPC), or other carrier having high thermal conductivity. The point light sources 2420 are, for example, light emitting diodes or organic light emitting diodes. In addition, to improve the heat dissipation efficiency, the LCD 200 further includes a heat dissipation layer 2500 disposed between the front frame 2300 and the light strip 2400.

Figure 6:
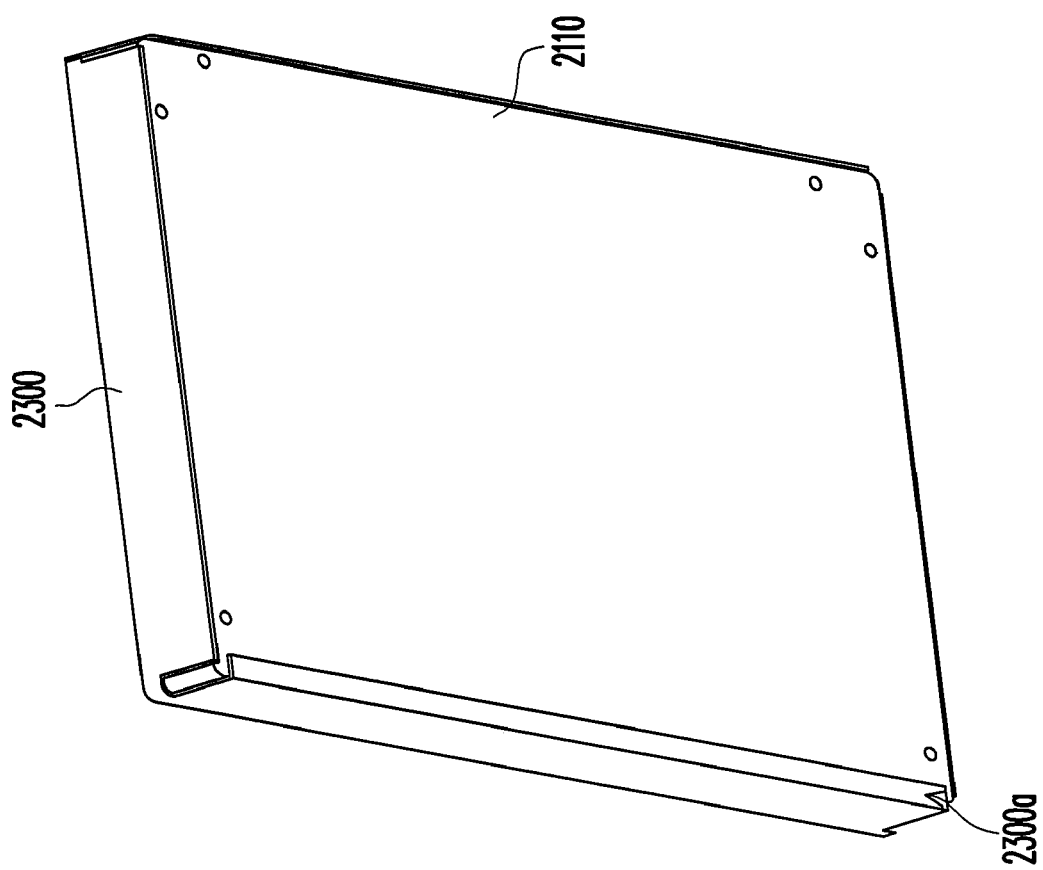
FIG. 6 is an assembly view of the front frame and the back plate in FIG. 2A.

FIG. 6 is an assembly view of the front frame and the back plate in FIG. 2A. Referring to FIG. 2B and FIG. 6, the front frame 2300 is assembled with the back plate 2110 to fix the LCD panel 2200. In particular, the top 2300a of the front frame 2300 adjacent to the sidewall of the light entering surface 2120a is curved into L shape so that the front frame 2300 can be assembled with the back plate 2110.

In overview, the LCD in the present invention has at least the following advantages:

1. The light strip is disposed on the internal wall of the front frame, and generally the front frame is formed with material of high thermal conductivity (for example, iron or stainless steel), thus, the heat produced by the light strip can be conducted to external through the front frame, so that the illumination efficiency of the light strip can be prevented from being affected by local high temperature.
2. Compared to conventional technology, wherein a frame is used for supporting the LCD panel, the present invention adopts the back plate for directly supporting the LCD panel, thus the cost of the frame can be saved.
3. The back plate has an opening for taking out and assembling the light guide plate, the first optical film, and the second optical film. Thus, the LCD in the present invention is suitable for rework and assembly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display, comprising:
   a backlight module, comprising:
   a back plate, having a plurality of sidewalls and an opening, the opening being opposite to one of the sidewalls;
   a light guide plate, disposed in the back plate and directly in contact with the side walls of the back plate, the light guide plate being suitable for passing in and out the back plate through the opening, the light guide plate having a light entering surface, the opening exposing the light entering surface;

a liquid crystal display panel, disposed on the back plate of the backlight module;

a front frame, having a plurality of vertical sidewalls enclosing a holding space for assembling with the back plate to fix the liquid crystal display panel; and a light strip, disposed on the internal wall of the front frame and between the front frame and the light entering surface of the light guide plate, wherein the light strip comprising a carrier and a plurality of point light sources, the carrier is directly disposed on the inner surface of at least one of the vertical sidewalls of the front frame, and the point light sources are disposed on a surface of the carrier, such that the surface of the carrier which the point light sources disposed thereon faces to the light entering surface of the light guide plate.

2. The liquid crystal display as claimed in claim 1, wherein the light strip comprising a carrier and a plurality of point light sources disposed on the carrier.

3. The liquid crystal display as claimed in claim 1 further comprising a heat dissipation layer disposed between the front frame and the light strip.

4. The liquid crystal display as claimed in claim 1, wherein the tops of the sidewalls are curved into L shape to support the liquid crystal display panel.

5. The liquid crystal display as claimed in claim 1, wherein the backlight module further comprises a buffer strip disposed between the liquid crystal display panel and the light guide plate.

6. The liquid crystal display as claimed in claim 5, wherein the backlight module further comprises a reflector disposed between the buffer strip and the light guide plate.

7. The liquid crystal display as claimed in claim 1, wherein the top of the front frame adjacent to the sidewall of the light entering surface is curved into L shape.

8. The liquid crystal display as claimed in claim 1, wherein the backlight module further comprises a plurality of locating blocks disposed in the corners of the back plate.

9. The liquid crystal display as claimed in claim 8, wherein the material of the locating blocks comprises rubber.

10. The liquid crystal display as claimed in claim 1, wherein the point light sources comprise light emitting diodes or organic light emitting diodes.

11. The liquid crystal display as claimed in claim 1, wherein the backlight module further comprises at least a first optical film disposed between the back plate and the light guide plate.

12. The liquid crystal display as claimed in claim 1, wherein the backlight module further comprises at least an optical film disposed between the liquid crystal display panel and the light guide plate.

13. The liquid crystal display as claimed in claim 1, wherein the material of the front frame comprises metal.

14. The liquid crystal display as claimed in claim 13, wherein the metal comprises iron or stainless steel.

* * * * *